United States Patent

Hohmann et al.

[11] 3,980,677
[45] Sept. 14, 1976

[54] ANTHRAQUINONE DYESTUFFS CONTAINING SULPHONIC ACID GROUPS

[75] Inventors: Walter Hohmann; Klaus Wunderlich, both of Leverkusen; Hans-Samuel Bien, Burscheid, all of Germany

[73] Assignee: Bayer Aktiengesellschaft, Leverkusen, Germany

[22] Filed: Sept. 18, 1975

[21] Appl. No.: 614,524

Related U.S. Application Data

[60] Continuation of Ser. No. 407,784, Oct. 19, 1973, which is a division of Ser. No. 49,156, June 23, 1970, Pat. No. 3,823,168.

[30] Foreign Application Priority Data

June 27, 1969 Germany.......................... 1932647

[52] U.S. Cl. ................................. 260/373; 8/39 B; 260/239.3 T; 260/243 B; 260/247.1 A; 260/262; 260/272; 260/303; 260/326 D; 260/326.33; 260/326.5 S; 260/340.3; 260/372; 260/376; 260/377; 260/380
[51] Int. Cl.²......................................... C09B 1/52
[58] Field of Search..................... 260/373

[56] References Cited
UNITED STATES PATENTS

| | | | |
|---|---|---|---|
| 812,684 | 2/1906 | Schmidt............................. | 260/373 |
| 2,337,566 | 12/1943 | McNally et al. ................ | 260/373 X |
| 3,691,209 | 9/1972 | Greenhalgh..................... | 260/373 X |
| 3,862,967 | 1/1975 | Hohmann et al. .............. | 260/373 X |

Primary Examiner—Paul F. Shaver
Attorney, Agent, or Firm—Plumley and Tyner

[57] ABSTRACT

Dyestuffs which contain sulphonic acid groups and correspond to the formula

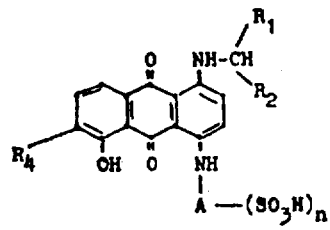

in which $R_1$ and $R_2$ denote lower alkyl radicals with 1 – 3 carbon atoms, which may be substituted; A means an optionally substituted aliphatic, cycloaliphatic, araliphatic, aromatic or heterocyclic radical; $n$ stands for 0, 1 or 2; and $R_4$ denotes a sulphonic acid group when $n = 0$ and denotes hydrogen or a sulphonic acid when $n = 1$ or 2.

The dyestuffs are eminently suitable for the dyeing and printing of natural and synthetic polyamide fiber materials.

2 Claims, No Drawings

ANTHRAQUINONE DYESTUFFS CONTAINING SULPHONIC ACID GROUPS

This is a continuation of application Ser. No. 407,784, filed Oct. 19, 1973, which in turn is a division of Ser. No. 49,156 filed June 23, 1970, now U.S. Pat. No. 3,823,168.

The invention relates to valuable new dyestuffs which contain sulphonic acid groups and correspond to the formula

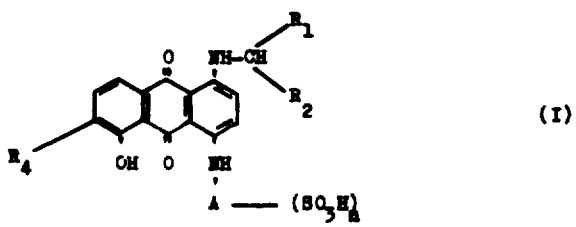

(I)

in which $R_1$ and $R_2$ denote lower alkyl radicals with 1 – 3 carbon atoms, which may be substituted; A means on optionally substituted aliphatic cycloaliphatic, araliphatic, aromatic or heterocyclic radical; $n = 0$, 1 or 2; and $R_4$ denotes a sulphonic acid group if $n = 0$ or denotes hydrogen or a sulphonic acid group if $n = 1$ or 2.

The radical A may contain one or more further substituents, such as alkyl radicals, preferably with up to 4 carbon atoms; cycloalkyl, preferably cyclohexyl radicals; phenoxy radicals; alkoxy, preferably lower alkoxy radicals; alkylmercapto, preferably lower alkylmercapto radicals; arylmercapto, preferably phenylmercapto radicals, alkylsulphonyl, preferably lower alkylsulphonyl radicals; arylsulphonyl radicals; halogen atoms such as chlorine, bromine, fluorine; sulphonic acid amide, such as sulphonic acid sulphophenyl amide radicals, or sulphonic acid ester radicals; carboxamide or carboxylic acid ester radicals; nitrile or amino groups which may be substituted, e.g. by alkyl, aryl, acyl or cycloalkyl radicals or also heterocyclic radicals, and aryl radicals preferably being substituted phenyl radicals.

The radicals $R_1$, $R_2$ may contain simple substituents such as OH and lower alkoxy groups or sulphate radicals, as well as halogen atoms such as fluorine, chlorine or bromine, and optionally substituted amino groups.

Preferred groups of dyestuffs corresponding to the general formula (I) are those of the general formulae (II) and (III)

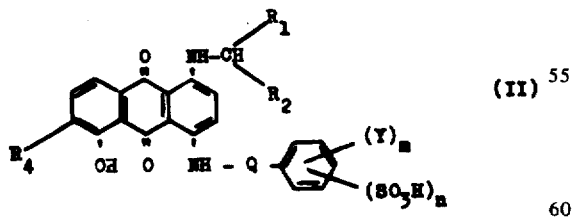

(II)

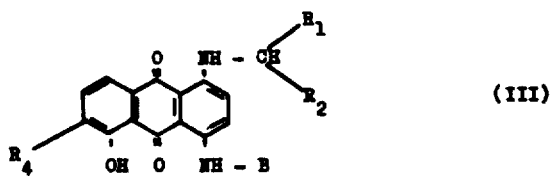

(III)

in which $R_1$, $R_2$, $R_4$ and $n$ have the same meaning as above, and Q stands either for alkylene with 1 – 7 carbon atoms, which may be substituted and may be straight-chain or branched, or for a direct bond; Y stands for hydrogen or a substitutent; $m$ for the numbers 1, 2 or 3; and B for straight-chain or branched, optionally substituted alkyl radicals with 1 – 6 carbon atoms or for optionally substituted cycloalkyl radicals with 6 ring members. If $R_4$ denotes hydrogen, B must contain a sulphonic acid group. If $m$ stands for a number greater than 1, Y may represent identical or different substituents.

Suitable radicals Y are optionally substituted alkyl, alkoxy, alkylmercapto or alkylsulphonyl radicals, especially those with 1 – 4 carbon atoms; halogen (F, Cl, Br), optionally mono- or disubstituted amino groups, with substituents such as optionally substituted phenyl groups, alkyl groups; acyl groups such as optionally substituted alkylcarbonyl, arylcarbonyl, especially phenylcarbonyl, arylsulphonyl, especially optionally substituted phenylsulphonyl groups; optionally substituted phenylsulphonyl, phenylmercapto, phenyloxy radicals; carboxylic acid amide or sulphonic acid amide radicals which may be mono- or disubstituted, for example, sulphonic acid monosulphophenylamide; sulphonic acid and carboxylic acid ester radicals, especially -alkyl ester radicals; CN, aralkyl radicals, especially optionally substituted benzyl radicals.

Examples of Q are: methylene, 1,2-ethylene, 1,1-ethylene, 1,3-propylene, 1,1-propylene, 1,2-propylene, 2,1-propylene, 2,4-butylene, 3-isobutyl-3,1-propylene radicals.

Examples of radicals B are: unsubstituted alkyl radicals such as methyl, ethyl, n- or i-propyl, n-, i- or tert.-butyl, n- or i-pentyl, n- or i-hexyl radicals; unsaturated alkyl radicals such as e.g. the allyl radical; substituted alkyl radicals such as e.g. the hydroxyethyl, methoxyethyl, amino-ethyl, methylamino-ethyl, ω-carboxy-propyl, cyanoethyl, sulphatoethyl, sulphophenylalkyl radicals such as the sulphophenylisobutyl radical; the cyclohexyl radical, substituted cyclohexyl radicals such as e.g. hydroxy, 4-methoxy, 3- or 4-methyl, 4-aminocyclohexyl radicals; sulphobenzyl-cyclohexyl radicals.

The new dyestuffs of the general formula (I) are obtained when compounds of the general formula

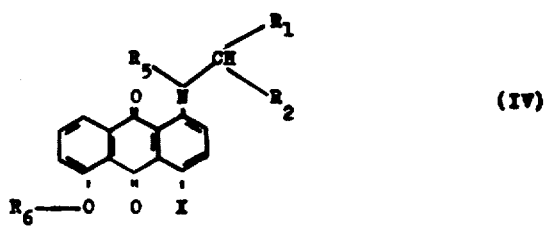

(IV)

in which $R_1$ and $R_2$ have the same meaning as above; X stands for a radical which can be exchanged for substituted amino groups; and $R_5$ and $R_6$ denote hydrogen or an acyl radical, are reacted with amines of the general formula

(V)

in which A has the same meaning as above, to form dyestuffs of the general formula

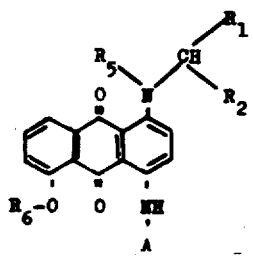

(VI)

in which $R_1$, $R_2$, $R_5$, $R_6$ and A have the same meaning as above, the products so obtained are sulphonated and any acyl radicals present (if $R_5$ and/or $R_6$ = acyl) are hydrolysed before or after sulphonation.

The compounds of the general formula (IV) can be obtained, for example, from appropriate 1-alkylamino-anthraquinone-5-sulphonic acids by exchanging the sulpho group for the hydroxyl group, for example, by a lime pressure melt as described in German Patent Specification No. 195,874 and subsequent bromination of the resultant compounds in the 4-position of the anthraquinone ring, e.g. in an aqueous mineral acid solution or suspension, and, if desired, acylation with acid chlorides or acid anhydrides by known methods. The alkylamino-anthraquinone-5-sulphonic acids can be obtained by reacting anthraquinone-1,5-disulphonic acid or its salts with secondary amines, such as iso-propylamine, sec.-butylamine, 1-hydroxy-2-amino-butane, 3-amino-pentane, as described in the case of isopropylamine in Belgian Patent Specification No. 729,177.

Suitable exchangeable radicals X are, for example, halogen atoms such as chlorine or, preferably, bromine. Examples of acyl radicals represented by $R_5$ and/or $R_6$ are alkoyl radicals such as the acetyl radical; aroyl radicals such as optionally substituted benzoyl radicals; arylsulphonyl radicals such as optionally substituted phenylsulphonyl radicals.

Examples of amines of the general formula (V) are aromatic amines, such as aniline, α- or β-naphthylamine, o-, m-, p-toluidine, 2,6-dimethylaniline, 2,4,6-trimethylaniline, 2-methyl-6-ethyl-aniline, 2,4-dimethyl-6-ethylaniline, 2,6-diethyl-4-methyl-aniline, p-tert.-butylaniline, p-dodecylaniline, p-cyclohexylaniline, o-, m-, p-chloroaniline, m-bromoaniline, p-fluoroaniline, 3-chloro-4-methylaniline, m-amino-benzonitrile, o-, m-, p-anisidine, 3-ethoxy-aniline, 2-, 3- or 4-[β-hydroxy]-ethoxy-aniline, 4-[β-cyano]-ethoxy-aniline, 4-methoxy-3-chloroaniline, 2-methyl-4-methoxy-aniline, 2,5-diethoxyaniline, [4-amino]-benzylmethylamine, 4-aminobenzodioxan, 4-aminophenyl-β-[N,N-diethylamino]-ethyl ether, aminohydroquinonedimethyl ether, [(o-, m-, p-,)-amino]-N,N-dimethyl-benzylamine, 4-aminodiphenyl ether, (o-, m-, p-)thioanisidine, 4-aminodiphenyl thioether, 3-[β-hydroxyethyl]-sulphonylaniline, 3-phenylsulphonyl-aniline, (m-, p-)-phenylene-diamine, 3- or 4-aminoacetanilide, N-methyl-N-acetyl-p-phenylene-diamine, N-cyclohexyl-N-acetyl-p-phenylene-diamine, glycollic acid-[3- or 4-amino]-anilide, N-[4-amino]-phenyl-pyrrolidone, glycollic acid-[4-amino]-phenyl ester, 3-amino-benzene-sulphonic acid phenyl ester; anthranilic acid, 4-acetylamino-anthranilic acid, 4-acetylamino-anthranilic acid, 3-aminobenzoic acid, 2,3,4-amino-benzoic acid methyl ester, 3-amino-4-methyl-benzoic acid, p-acetylaniline, 3-amino-4-methoxy-benzene-sulphonic acid diethylamide, 3-aminobenzene-sulphonic acid-N-[β-hydroxy]-ethyl-N-[β-cyano]-ethyl-amide, 4-amino-benzenesulphonic acid-di-[β-cyano]-ethylamide, 3-amino-benzene-sulphonic acid-di-[β-hydroxy]-ethylamide.

Examples of suitable cycloaliphatic amines of the formula (V) are cyclohexylamine, hexahydro-p-phenylene-diamine, N-acetyl-hexahydro-p-phenylene-diamine, hexahydro-o-, -m- and -p-toluidine, hexahydroaminophenyl, 2- or 4-benzyl-cyclohexylamine, 4-tert.-butyl-cyclohexylamine, 3-cyano-cyclohexylamine, halogenated cyclohexylamines, 2- or 4-nitrobenzyl-cyclohexyl-amine.

Suitable aliphatic amines of the formula (V) are, for example, methylamine, ethylamine, (n-, iso-)-propylamine, (n-, iso-, sec.-, tert.-)butylamine, β-hydroxyethylamine, 3-amino-pentane, 3-methoxy-propylamine.

Examples of suitable araliphatic amines of the formula (V) are benzylamine, 1-phenyl-2-amino-ethane, 1-phenyl-3-amino-butane, 1-phenyl-2-aminopropane, 1-phenyl-5-methyl-hexylamine-(3), 1-phenyl-3-cyclohexyl-propylamine-(3), 2-phenyl-2-methyl-pentylamine-(4).

The preparation of the compounds of the general formula (VI) can be carried out in known manner in an organic or aqueous-organic medium, possibly in the presence of copper or copper salts as catalysts and optionally with the addition of acid-binding agents.

The hydrolysis of the acyl groups in the case where $R_5$ and/or $R_6$ stand for acyl, can be carried out with alkaline agents, for example, with aqueous alkali metal hydroxides in pyridine/methanol or, preferably, with acidic agents, primarily with aqueous mineral acids.

As examples, the following compounds of the formula (VI) are mentioned:
1-Isopropylamino-5-hydroxy-4-anilino-anthraquinone, 1-Isopropylamino-5-hydroxy-4-(o-, m-, p-)methylanilino-, 4-o-, m-, p-)-methoxyanilino-, -4-(o-, m, p-) ethoxyanilino-, -4-(o-, m-, p-)-chloroanilino-, -4-(o-, m-, p-)bromoanilino-, -4-(m-, p-)fluoroanilino-, -4-(m-, p- )aminoanilino, -4-(o-, m-, p-)acetylbenzoylaminoanilino-, -4-(m-, p-)-gylkoylaminoanilino-, -4-(o-, m-, p-)N-methylacetylaminoanilino-, -4-(m-, p-)-n-, iso-, tert.-butylanilino-, -4-(2', 3'-, 2',4'-, 2',5'-, 2',6'-(dimethylanilino-, -4-(2',4',6'-)trimethylanilino-, -4-(2',6')-diethyl-4-methylanilino-, -4-(o-, m-, p-)carboxyanilino-, -4-(m-, p-)-N-methylaminomethylanilino-, -4-(m-, p-)carbamoylanilino-, -4-(o-, m-, p-)phenoxyanilino-, -4-(m-, p-)phenylsulphonylanilino-, -4-p-phenylmercapto-anilino-, -4-(o-, m-, p-)phenylamino-anilino, -4-(m-, p-)-phenylanilino-, -4-m-cyano-anilino-, -4-(m-, p-)-methylmercapto-anilino-, -4-(m-, p-)ethylmercaptoanilino-, -4-(2'-methoxy-5'-methyl)-anilinoanthraquinone, 1-Isopropylamino-5-hydroxy-4-benzylamino-, -4-ω-phenylethylamino-, -4-ω-phenylpropylamino-, 4-ω-phenylbutylamino-(1' oder 2')-, -4-ω-phenyl-(2')-methylhexylamino-(4')-, -4-1'-phenyl-1',1'-dimethyl-butylamino-(3')-, -4-1'-piperazinyl-N-β-ethylamino-, -4-β-phenoxyethylamino-, -4-cyclohexylamino-, -4-(o-, m-, p-)-methyl-, -hydroxy-, -amino-, acetylamino-, -(o-, p-)benzylamino-, -(m-, p-) glykoylamino-, -tert.-butylcyclohexylamino-anthraquinone, 1-Isopropylamino-5-hydroxy-4-methyl-, -4-ethyl-, -4-propyl-, -4-butyl-, -4-pentyl-, -4-β-hydroxyethyl-, -4-γ-methoxypropyl-, -4-γ-aminoethyl-, -4-γ-acetylaminopropyl-, -4-(pyridyl-2'-respectively-4'-)-amino-anthraquinone, 1-Isopropyl-5-hydroxy-4-(o-, m-, p-)-sulfamoyl-anilino-, respectively -toluidino-, -anisidino-, mesidino-, 2',6'-diethyl-4'-methyl-anilino-, -2',6'-dimethylanilino-, butylanilino-, -amino-anilino- or -acetylaminoanilino-anthraquinone, 1-Isopropyl-5-hydroxy-4-methylaminosulphonyl-anilino- respectively -4-ethyl-, -propyl-, -β-hydroxyethyl-, β-phenylethyl-, -ω-phenylbutyl-(2')-, -γ-phenylpropyl-, β-methoxyethyl-, -β-ethoxyethyl-, β-hydroxy-β-ethoxyethylaminosulphonyl-anilino- respectively -toluidino-, -anisidino-, mesidino-, -butyl-anilino-, -2',-6'-dimethylanilino-, -2',6'-diethyl-4'-methylanilino-, -(o-, m-, p-)-acetylamino-anilino-anthraquinone, 1-Isopropyl-5-hydroxy-4-anilino-sulphonylanilino-anthraquinone respectively -4-methyl-, -methoxy-, -ethoxy-, -butyl-, -amino-, -acetylamino- or -bromo-anilino-, sulphonylanilino- respectively -methyl-, -methoxy-, -ethoxy-, -butyl-, -acetylaminoanilino-anthraquinone, 1-Isopropyl-amino-5-hydroxy-4(o-, m-, p-)-morpholino- respectively -thiomorpholino- respectively -piperidino-N-sulphonyl-anilino-, -methyl-, methoxy- or -acetylamino-anilino-anthraquinone, 1-Isopropylamino-5-hydroxy-4-dimethylamino- respectively -diethylamino-, -β-hydroxyethylamino- or -β-phenylethylamino-sulphonyl-m-aminoanilino- respectively -methylanilino- or -methoxyanilino-anthraquinone, 1-Isopropylamino-5-hydroxy-4-(dimethylamino-, -ethylamino-, -β-hydroxyethylamino- or -β-phenylethylamino)- sulphonyl-p-phenyl- respectively -phenylamino-, -phenylmercapto- or -phenoxyanilino-anthraquinone, 1-Isopropylamino-5-hydroxy-4-phthalimido-methyl-, -4-N-hexahydro-2''-azepinonyl-methyl-, -4-N-heptahydro-2''-azocinonylmethyl-, -4-N-octahydro-2''-azoninonylmethyl-, -4-N-nonahydro-azecinonylmethyl-, -4-N-2''-pyrrolidonylmethyl-, -4-propionyl-aminomethyl-, -4-benzoylaminomethyl-, -4-o-carboxybenzoylaminomethyl-, -4-succinimidomethyl-, -4-carbamoylaminomethyl-, -4-carbethoxyaminomethyl-, -4-chloroacetylaminomethyl-(o-, m-, p-)methoxy- respectively -methyl-, -2',6'-dimethyl-, -2,4,6-trimethyl-, -2,6-diethyl-4-methyl-, -amino-, -acetylamino-, -ethoxy-anilino-anthraquinone.

Further compounds of this type are those with a 1-isobutyl-amino-(2')-, 1-isopentylamino-(2')-or one 1-1'-hydroxyisobutylamino-(2')-respectively -(3')-group in place of the 1-isopropylamino group or the respective compounds with an acylated isopropylamino group in 1-position and/or an acylated hydroxy group in 5-position whereby acetyl-, propionyl-, benzoyl- and p-toluenesulphonyl- radicals are expecially suitable.

Further compounds are sulphonic acid semi-esters of 1-isopropylamino-5-hydroxy-4-(o-, m-, p-)glykolaminoanilino-, -4-β-hydroxyalkylamino-, -4-β-hydroxypropylamino-, -4-ω-hydroxyethylamino- or -4-ω-hydroxypropylamino-sulphonyl-anilino- respectively -acetamino-anilino-, anisidino-, -toluidino- or -medisino-anthraquinone respectively the sulphonic acid semi-esters of 1-(1'-hydroxy-isobutylamino-(2')-5-hydroxy-4-anilino- respectively -4-anisidino-, -4-toluidino-, -4-mesidino-, -4-dimethylanilino-, -4-acetylaminoanilino- or -4-butylanilino-anthraquinone.

The sulphonation can be performed with sulphuric acid, SO₃-containing sulphuric acid, chlorosulphonic acid or with mixtures of these acids at room temperature or elevated temperature, optionally in the presence of boric acid or of inorganic salts such as Na₂SO₄.

If the radical A in the formula (VI) is a radical which can easily be sulphonated, for example, the phenyl or p-methyl-phenyl radical, mild sulphonating conditions generally lead only to the sulphonation of this radical, and an additional sulphonic acid group enters the nucleus in the o-position to the hydroxyl group only under sharper sulphonating conditions (R₄ = SO₃H). If A represents a radical which is sulphonated with difficulty, for example, the methyl-sulphonyl-phenyl-group, one sulphonic acid group initially enters in the o-position to the hydroxyl group of the nucleus, and a further sulphonic acid group enters the radical A only under very sharp reaction conditions. Finally, if A represents an alkyl or cycloalkyl radical, that is to say a grouping which cannot be sulphonated, only one sulphonic acid group enters in the o-position to the hydroxyl group of the nucleus. If the alkyl radicals or R₁, R₂ contain hydroxyl groups so that e.g. a β-hydroxyethyl group is present, then esterification with H₂SO₄ may additionally take place.

If the radical A contains a further primary or secondary amino group, the compounds of the formula (VI) obtained according to the present process may be subsequently acylated. Acylating agents suitable for this purpose are, inter alis, benzoyl chlorides substituted by lower alkyl, lower alkoxy or halogen groups; sulphochlorides, such as methyl-, p-toluene-, benzene- or α-naphthyl-sulphochloride; and also chloroformic acid phenyl or alkyl esters. In the two last-mentioned cases there are obtained urethanes which can be converted into urea derivatives by further reaction with lower aliphatic amines, such as hydroxyethylamine or 3-methoxy-propylamine. The sulphonation of the compounds so obtained can be carried out by known methods. By partial conversion of the sulphonic acids obtained into sulphochlorides, e.g. by means of thionyl chloride, and subsequent reaction with lower aliphatic amines which may be substituted, such as β-hydroxyethylamine, diethanol-amine, 3-methoxy-propylamine, and possibly by subsequent sulphonation of the products obtained in this way, there can be obtained dyestuffs of the formula (I) which contain sulphonamide groups.

A variant of the process for the production of compounds of the general formula (I) consists in that compounds of the general formula (IV) are reacted with amines of the general formula

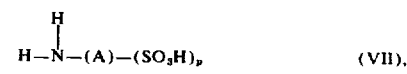

in which A has the same meaning as above and p stands for 1 or 2, to form compounds of the general formula

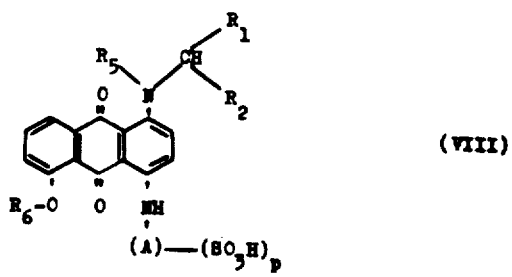

in which $R_1$, $R_2$, $R_5$, $R_6$, A and p have the same meaning as above, and, if desired, the compounds thus obtained are hydrolysed and/or sulphonated in any sequence.

Another suitable variant of the process for the production of compounds of the general formula (I) consists in that compounds of the general formula (IV) are converted by sulphonation into compounds of the general formula

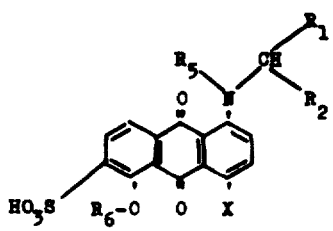

(IX)

in which $R_1$, $R_2$, $R_5$, $R_6$ and X have the same meaning as above, and the latter are then reacted with amines of the general formula (V) or (VII) to form compounds of the general formulae

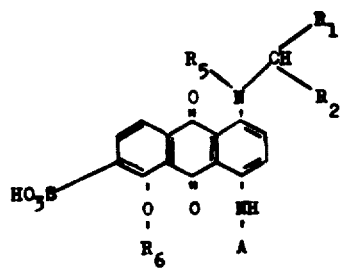

(X)

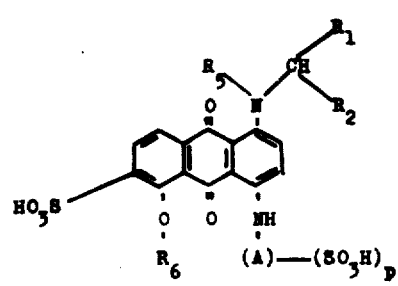

(XI)

in which $R_1$, $R_2$, $R_5$, $R_6$, A and p have the same meaning as above, and, if desired, the compounds thus obtained are hydrolysed and/or sulphonated in any sequence.

The dyestuffs of the general formulae (I), (VI), (VIII), (X) or (XI) obtained according to one of these processes can be subsequently halogenated by known methods, for example, with chlorine or bromine, and then hydrolysed and/or sulphonated, if desired.

The new dyestuffs are valuable products which are eminently suitable for the dyeing and printing of natural and synthetic polyamide fibre materials, such as wool, silk and synthetic polyamide fibres, on which dyeings of very good fastness properties are obtained.

The parts given in the Examples are parts by weight unless otherwise stated; the temperatures are given in degrees Centigrade.

EXAMPLE 1

18 Parts 1-isopropylamino-4-bromo-5-hydroxy-anthraquinone are stirred together with 27 parts p-toluidine, 6 parts potassium acetate and catalytic amounts of copper(I) chloride at 100°–110° until only small amounts of starting material can be detected by chromatography. The mixture is diluted with 70 parts ethylene glycol monomethyl ether, suction-filtered when cold, and the filtrate is successively washed with ethylene glycol monomethyl ether and water, and dried. The resultant 1-isopropylamino-4-p-toluidino-5-hydroxy-anthraquinone can be sulphonated as follows:

A. Monosulphonation

3 Parts are dissolved in 30 parts of anhydrous sulphuric acid at room temperature and 1 part of 20% oleum is added. When the starting material can no longer be detected by chromatography, the solution is poured cold into a 10% sodium chloride solution, the precipitated dyestuff is filtered off with suction and washed with a sodium chloride solution until neutral. The resultant dyestuff is the sodium salt of the compound

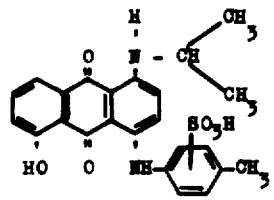

and can be purified by recrystallisation from hot water to which a few drops of pyridine are added. The sodium salt is obtained in the form of beautiful blue needles.

B. Disulphonation

5 Parts are dissolved with stirring in 50 parts of 6% oleum at 20°–25° and the solution is stirred at the same temperature until only traces of the monosulphonation product obtained according to (A) can be detected by chromatography. The mixture is poured into 300 parts of ice-water, neutralised with a concentrated sodium hydroxide solution, the precipitate is filtered off with suction and washed with a 10% sodium chloride solution. The resultant dyestuff is the sodium salt of the compound

[structure]

and can be obtained completely pure according to the following instruction:

The material is dissolved in 200 parts of water, the solution clarified at 90°, the product is precipitated from the clarified solution at 50° by means of 60 parts by volume of a saturated sodium chloride solution. The sodium salt which crystallises in the form of blue platelets is filtered off with suction, washed with a 3% sodium chloride solution, and dried in a vacuum. Yield: 5.6 parts.

EXAMPLE 2

A. 10 Parts of wool are dyed wth 0.2 parts of the dyestuff obtained according to Example 1(A) with the addition of 20% of calcined Glauber's salt in a strand dyeing apparatus in the usual way. A greenish blue dyeing of good levelness and fastness to light and of good general fastness properties is obtained.

B. 10 Parts of wool are dyed with 0.2 parts of the dyestuff obtained according to Example 1(A) with the addition of 3% formic acid and 8% of calcined sodium sulphate in a strand dyeing apparatus in the usual way. A greenish blue dyeing of good fastness to light and good general fastness properties is obtained.

C. 15 Parts of a synthetic polyamide fibre material are dyed with 0.6 parts of the dyestuff obtained according to Example 1(A) with the addition of 10% of Glauber's salt and 5% acetic acid almost at boiling temperature. A green-blue dyeing of good levelness and fastness to light is obtained in this way.

D. 20 Parts of natural silk are dyed with 0.1 part of the dyestuff obtained according to Example 1(A) with the addition of 10% of Glauber's salt and 4% formic acid at 100°. A green-blue dyeing of good general fastness properties is obtained.

E. If the dyestuff obtained according to Example 1(A) is replaced in (A) to (D) with the same amounts of the dyestuff obtained according to Example 1(B), then the resultant dyeings have a substantially more greenish tint.

Example 3

A. If the 18 parts 1-isopropylamino-4-bromo-5-hydroxy-anthraquinone are replaced in Example 1 with 18.7 parts 1-isobutylamino-(2')-4-bromo-5-hydroxy-anthraquinone, then the instructions there given lead to the dyestuffs (A) and (B) which likewise dye natural or synthetic polyamide fibres according to the dyeing instruction given in Example 2 in very fast greenish-blue (A) or blue-green (B) shades.

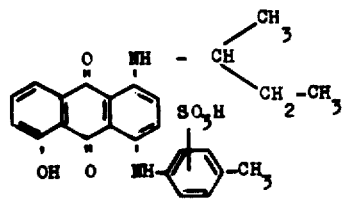

A

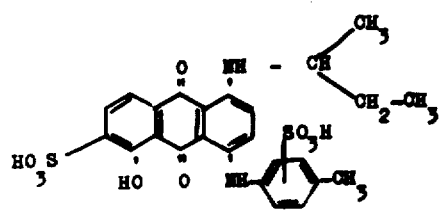

B

B. The 1-isobutylamino-(2')-4-bromo-5-hydroxy-anthraquinone used in (A) is obtained as follows:

110 Parts sodium anthraquinone-1,5-disulphonate are heated together with 44 parts sodium m-nitrobenzene-sulphonate, 13 parts magnesium oxide, 1.3 parts copper sulphate. 5 $H_2O$, 386 parts of water and 43.6 parts of sec. butylamine in an autoclave at 130° for 48 hours while stirring. After cooling, the reaction mixture is acidified with hydrochloric acid, the product is filtered off with suction and washed with a 2% sodium chloride solution until neutral. The moist filter cake is dissolved hot in 2700 parts of 2.5% hydrochloric acid. The solution is filtered off with suction while hot and the filtrate mixed with 50 parts sodium chloride. After cooling, the mixture is suction-filtered, the filtrate washed with a 2% sodium chloride solution until neutral, and dried. There are thus obtained 76.8 parts sodium 1-sec. -butylamino-anthraquinone-5-sulphonate containing about 92% of pure product.

From this compound there is obtained 1-butylamino-(2')-5-methoxy-anthraquinone and therefrom the 1-butylamino-(2')-5-hydroxy-4-bromo-anthraquinone is obtained according to the following instruction:

100 Parts 1-butylamino-(2')-5-methoxy-anthraquinone are dissolved in 200 parts by volume of 70% sulphuric acid and the solution is heated at 120° – 125° until the methoxy compound can no longer be chromatographically detected in a sample. The mixture is then diluted with 500 parts by volume of 30% hydrochloric acid, and 65 parts bromine are rapidly added at 15° with instense stirring. The mixture is stirred at room temperature until less than 5% 1-butylamino-(2')-5-hydroxy-anthraquinone can be chromatographically detected in a sample. The mixture is stirred into 5000 parts of cold water, the excess of bromine is removed with the aid of just the necessary amount of a bisulphite solution, the mixture is suction-filtered, the filtrate washed until neutral and dried. 120 Parts are obtained.

In the same way as described in (B) there can be obtained from anthraquinone-1,5-disulphonic acid and 3-aminopentane the 1-pentyl-(3')-5-hydroxy-4-bromo-anthraquinone or, with 1-hydroxy-butylamine(2), the 1-(1'-hydroxybutylamino-(2')-5-hydroxy-4-bromo-anthraquinone.

EXAMPLE 4

15 Parts 1-isopropylamino-4-bromo-5-hydroxy-anthraquinone, 70 parts p-anisidine and 3.2 parts of ground sodium carbonate are stirred at 175° – 180° C until the starting material can no longer be detected (appr. 1 hour is required). The mixture is diluted with 70 parts of alcohol, filtered off with suction and the filtrate is successively washed with alcohol and hot water. The resultant 1-isopropylamino-4-p-anisidino-5-hydroxy-anthraquinone can be sulphonated as follows:

A. Monosulphonation

3 Parts are stirred in a mixture of 17 parts by volume of monohydrate and 1 part by volume of 20% oleum at room temperature until the starting material can no longer be detected (appr. 45 minutes are required). The uniform sulphonation product corresponds to the formula

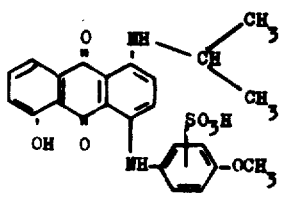

and is isolated as follows: the product is poured into 200 parts of a semi-saturated sodium chloride solution, the precipitate is filtered off with suction, washed with a 5% sodium chloride solution until neutral, and dried in a vacuum. Wool is dyed in a strongly greenish blue shade fast to light.

B. Disulphonation

3 Parts are treated in a mixture of 17 parts by volume of anhydrous sulphuric acid and 7 parts by volume of 20% oleum at room temperature until only traces of the sulphonation product obtained according to (A) can be detected (appr. 2 – 3 hours are required). The mixture is poured into 200 parts of a saturated sodium chloride solution, filtered off with suction, the filtrate is washed with a small amount of a 20% sodium chloride solution, pasted in a little water, the paste is neutralised with sodium carbonate and dried in a vacuum. The resultant dyestuff is uniform and is the sodium salt of the compound.

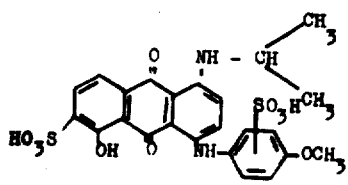

It dyes wool according to the dyeing methods described in Example 2 in fast blue-green shades.

EXAMPLE 5

18 Parts 1-isopropylamino-5-hydroxy-4-bromo-anthraquinone, 20 parts β-phenyl-ethylamine, 6 parts potassium acetate, catalytic amounts of copper(I) chloride and a few drops of water are stirred at 60° – 65° until only traces of starting material can be detected by chromatography. The mixture is diluted with 20 parts ethanol, the precipitated product is filtered off with suction at 70° and successively washed with hot ethanol and hot water. The resultant 1-isopropylamino-5-hydroxy-4-β-phenyl-ethyl-amino-anthraquinone can be sulphonated as follows:

A. Monosulphonation

8 Parts are introduced at 25° into 17 parts by volume of monohydrate at 25° and the mixture is stirred at the same temperature for 50 minutes. The solution is diluted with 15 parts of water, while cooling with ice, and poured into 200 parts of a semi-saturated sodium chloride solution to which 1 part of a bisulphite solution have been added. The product is filtered off with suction, washed with a sodium chloride solution until approximately neutral, dissolved in 200 parts of water, the solution is adjusted to pH 8 by means of a sodium carbonate solution, clarified at 60°, and the sodium salt is precipitated with the aid of a saturated sodium chloride solution.

The dyestuff corresponds to the formula

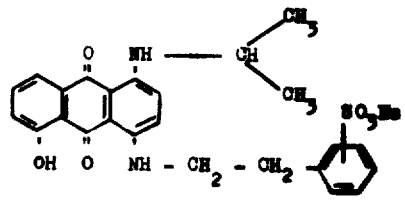

and dyes wool according to the instructions given in Example 2 in blue shades.

B. Disulphonation

When the 1-isopropylamino-5-hydroxy-4-β-phenylethylamino-anthraquinone is sulphonated, instead of in monohydrate, in 12% oleum at room temperature until only traces of the product obtained in (A) can be chromatographically detected, then working up with a saturated sodium chloride solution yields a dyestuff which appears not completely uniform in the chromatogram and substantially corresponds to the formula

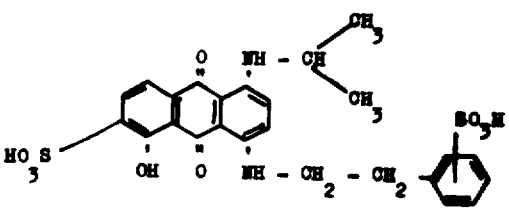

and which dyes polyamide fibres in a noticeably more greenish shade than the dyestuff obtained according to (A).

EXAMPLE 6

A. 15 Parts 1-N-acetyl-isopropylamino-5-acetoxy-4-bromo-anthraquinone, prepared from 1-isopropylamino-5-hydroxy-4-bromo-anthraquinone in boiling acetic acid anhydride with the addition of catalytic amounts of sulphuric acid, are stirred with 30 parts β-phenyl-ethylamine at 60° – 65° until the starting material can no longer be detected by chromatography. The mixture is diluted with 30 parts methanol, filtered off with suction and the filtrate is washed with methanol and water.

B. The resultant 1-N-acetyl-isopropylamino-5-hydroxy-4-β-phenyl-ethylamino-anthraquinone so obtained is dissolved in 10 times its weight of 75% sulphuric acid and heated at 60° – 70° until the starting material can no longer be detected. The solution is pasted, the paste is washed until neutral, and dried. The product is identical with the compound obtained according to Example 5, paragraph 1.

C. If the 15 parts 1-N-acetyl-isopropylamino-5-acetoxy-4-bromo-anthraquinone are replaced in Example 6(A) with 13.6 parts 1-N-acetyl-isopropylamino-5-hydroxy-4-bromo-anthraquinone (prepared from the corresponding acetoxy compound by dissolving in 75% $H_2SO_4$ and isolating after pasting), then working up as described in Example 6(A) and hydrolysis as described in Example 6(B) likewise yields a product which is identical with the one obtained according to Example 5, paragraph 1.

D. If the 15 parts 1-N-acetyl-isopropylamino-5-acetoxy-4-bromo-anthraquinone are replaced in Example 6(A) with 19.2 parts 1-N-benzoyl-isopropylamino-4-bromo-5-benzoyloxy-anthraquinone (prepared from 1-isopropylamino-5-hydroxy-4-bromo-anthraquinone and benzoyl chloride with the addition of catalytic amounts of sulphuric acid), then working up in analogy with Example 6(A) and subsequent hydrolysis with 80% sulphuric acid again yields a product which is identical with the one obtained according to Example 5, paragraph 1.

E. If, instead of working up the reaction product obtained in Example 6(A) in the manner there described, it is allowed to cool, 100 parts sulphuric acid monohydrate are added with stirring, the mixture is heated at 60° – 65° until the starting material can no longer be detected by chromatography and a sample is completely soluble in hot water, and the product is then worked up as described in Example 5(A), then there is obtained a dyestuff which substantially corresponds to the formula of Example 5(A), but dyes wool in a somewhat more greenish shade.

EXAMPLE 7

108 Parts 1-isopropylamino-4-bromo-5-hydroxy-anthraquinone are stirred with 120 parts by volume 2-methyl-6-ethylaniline, 36 parts potassium acetate and 0.3 parts copper(I) chloride at 140° – 150° until the starting material can no longer be detected by chromatography. The mixture is stirred into 3000 parts by volume of cold 20% sulphuric acid, stirring is continued for about 30 minutes, the product is filtered off with suction and washed initially with dilute sulphuric acid, later with water until the runnings are neutral, and dried at 50° in a vacuum. 121 Parts of crude 1-isopropylamino-4-(2'-methyl-6'-ethyl)-anilino-5-hydroxy-anthraquinone are obtained.

This crude base can be purified as follows: It is dissolved in 10 times its volume of 85% sulphuric acid and the acid concentration is reduced at 40° to 75% sulphuric acid by slowly adding the necessary amount of water; stirring is continued for some time, the precipitated well crystallised sulphate is filtered off with suction and washed with 70% sulphuric acid. The filter cake is placed into water with stirring, the sulphate being hydrolysed. It is filtered off with suction, washed until neutral and dried.

A. Monsulphonation

8 Parts of purified 1-isopropylamino-4-(2'-methyl-6'-ethyl)-anilino-5-hydroxy-anthraquinone are dissolved in 40 parts by volume of monohydrate at below 30°; sufficient 20% oleum (appr. 3 – 4 parts by volume are required) is added in portions with stirring so that the starting material can no longer be detected in a sample which has been worked up and chromatographed. The mixture is poured into 300 parts of a saturated sodium chloride solution and 100 parts of ice, the precipitated product is filtered off with suction, washed with a 5 – 10% sodium chloride solution until neutral, and dried.

There are obtained 10.5 parts of the compound

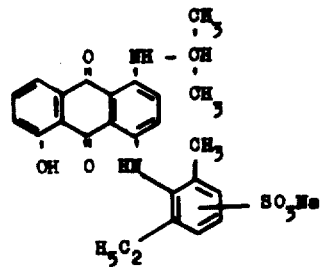

which dyes wool and Perlon according to the dyeing instructions of Example 2 in very clear blue shades of outstanding fastness.

B. Disulphonation

36 Parts 1-isopropylamino-4-(2'-methyl-6'-ethyl)-anilino-5-hydroxy-anthraquinone are dissolved in 195 parts by volume of monohydrate and the solution is gradually mixed at below 30° with sufficient 20% oleum (appr. 70 parts by volume are required) that less than 2% of the monosulphonic acid obtained in (A) can be detected by chromatography in a worked-up sample.

The solution is poured with stirring into a mixture of 1600 parts by volume of a saturated sodium chloride solution and 500 parts of ice, the largely dissolved product is precipitated cold by the addition of 350 parts by volume of a 40% sodium hydroxide solution, filtered off with suction, washed with an almost saturated sodium chloride solution until neutral, and dried at 60°.

There are obtained 64.4 parts of the compound

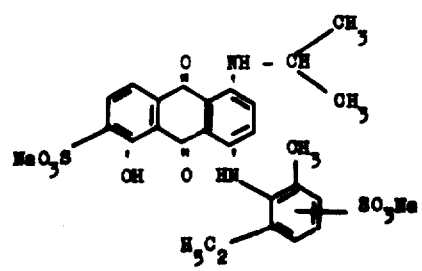

with a sodium chloride content of 17%.

This compound dyes wool according to the instruction of Example 2 in a very clear greenish blue shade of outstanding fastness.

EXAMPLE 8

A. 6 Parts sodium 1-isopropylamino-4-bromo-5-hydroxy-anthraquinone-6-sulphonate are added to a mixture of 15 parts by volume β-phenyl-ethylamine and 15 parts by volume of water, a solution of 0.05 parts copper(I) chloride in 0.5 parts of a concentrated sodium chloride solution is added and the mixture is heated to 60° – 65°. After a short time, the reaction product begins to be precipitated from the initially clear solution in the form of fine blue needles. The reaction is completed after about 1 hour.

The mixture is diluted with 25 parts methanol, the product is filtered off with suction at 50°, washed with warm methanol and hot water, and dried at 60°. There are obtained 4 parts of a product of the formula

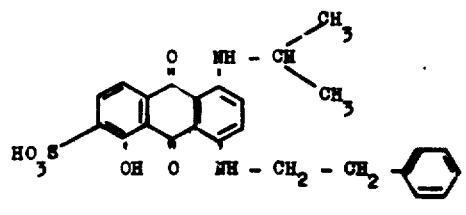

which dyes polyamide in a clear blue shade.

B. The 1-isopropylamino-4-bromo-5-hydroxy-anthraquinone-6-sulphonic acid used in (A) can be obtained as follows, for example:

100 Parts of 93% 1-isopropylamino-4-bromo-5-hydroxy-anthraquinone are introduced into 430 parts by volume of anhydrous sulphuric acid at below 20° while stirring, 105 parts by volume of 20% oleum are added and a further 35 parts by volume are added after 18 hours, the mixture is stirred at room temperature until the starting material can no longer be detected (appr. 42 hours are required). The mixture is then slowly diluted at below 40° with 700 parts of water; the sulphonic acid is precipitated in the form of needles which are filtered off with suction after prolonged stirring and washed with a little 50% sulphuric acid. The filtered material is stirred with water, neutralised with a sodium hydroxide solution, and sharply filtered off with suction. The filtered material is dissolved in 1250 parts of water at 80° and precipitated by slowly adding 70 parts of sodium chloride. The product is filtered off with suction at 50°, rinsed with a 10 – 5% sodium chloride solution, and dried at 60°. 101.5 Parts are obtained.

C. By the same method as described in (B), there is obtained from 1-butylamino(2)-4-bromo-5-hydroxy-anthraquinone, the 1-butylamino-(2)-4-bromo-5-hydroxy-anthraquinone-6-sulphonic acid, and from 1-pentylamino(3)-4-bromo-5-hydroxy-anthraquinone, the 1-pentylamino(3)-4-bromo-5-hydroxy-anthraquinone-6-sulphonic acid, or the sodium salts of these acids.

EXAMPLE 9

A. 30 Parts sodium 1-isopropylamino-4-bromo-5-hydroxy-anthraquinone-6-sulphonate, 150 parts p-anisidine, 12 parts potassium acetate are mixed with 0.15 parts copper(I) chloride at 100° while stirring, and stirring is continued at 115° – 120° until only a small amount of starting material can be detected in a sample by chromatography (apppr. 1 – 1½ hours are required). The melt is added to an ice-cold mixture of 1500 parts of a 15% sodium chloride solution and 200 parts of concentrated hydrochloric acid, the precipitate is filtered off with suction, washed until neutral with a semi-concentrated sodium chloride solution to which some hydrochloric acid has initially been added, and sharply filtered off with suction.

The filtered material is suspended in 800 parts of water, adjusted to pH 8 by the addition of some sodium hydroxide solution, and heated to 90° – 95°. The resultant solution is clarified by the addition of charcoal. When the mixture is cooling down, the dyestuff is gradually precipitated in the form of beautiful blue-green needles. A sufficient amount of concentrated sodium chloride solution is then carefully added so that the runnings have only a pale blue-green colour, the product is filtered off with suction, washed with a 5% sodium chloride solution until neutral, and dried.

27.8 Parts of the compound of the formula

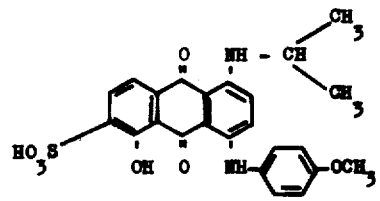

are obtained in pure form; it dyes wool and Perlon in clear blue-green shades.

B. If the compound is treated as described in Example 4(A), the compound of Example 4(B) is obtained.

EXAMPLE 10

30 Parts sodium 1-isopropylamino-4-bromo-5-hydroxy-anthraquinone-6-sulphonate, 120 parts m-phenylene-diamine, 12 parts potassium acetate and 150 mg copper(I) chloride are stirred at 120° – 125° for 45 minutes. The reaction mixture no longer contains any starting material. It is worked up as described in Example 9(A). The neutral filter cake is extracted by stirring with 800 parts of 3% pyridine-water at 80°, the product is filtered off with suction, washed with cold water until neutral, and dried. 23.5 Parts of the compound of the formula

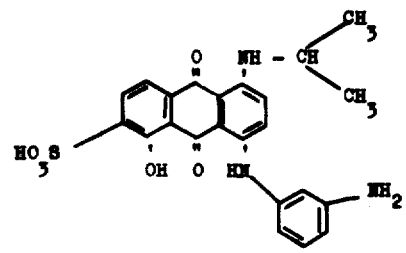

are obtained. It can be obtained in a completely pure and excellent crystalline form by recrystallisation from weakly aqueous pyridine in which it is soluble to give a clear green-blue solution. It can also be purified by stirring with hot aqueous dimethyl formamide or ethanol.

EXAMPLE 11

4.6 Parts sodium 1-isopropylamino-4-bromo-5-hydroxy-anthraquinone-6-sulphonate and 4.6 parts sodium m-phenylene-diamine-4-sulphonate are stirred in a mixture of 40 parts of water and 15 parts ethanol at 85° – 87°. To this mixture is added 1.2 parts sodium carbonate and a solution of 0.05 parts copper(I) chloride in 0.5 parts of a saturated sodium chloride solution, and stirring is continued at the same temperature with the portionwise addition of a further solution of 0.05 parts copper(I) chloride in 0.5 parts of a saturated sodium chloride solution, until no further progress of the reaction can be detected by chromatography.

The mixture is filtered, the residue is rinsed with a 3% sodium chloride solution. The filtrate (appr. 80 parts by volume) is mixed with 5 parts of solid sodium chloride, the mixture is filtered and sufficient solid sodium chloride is added to the filtrate that a slight cover of sodium chloride just remains at the bottom, the material is allowed to stand on an ice-bath for several hours, filtered, the blue product is washed with a saturated sodium chloride solution, and dried at 60°. A compound of the formula is obtained, which readily dissolves to give a clear greenish blue solution. It dyes wool and polyamide in clear greenish blue shades.

Reaction of 1-isoalkylamino-4-bromo-5-hydroxy-anthraquinones or 1-isoalkylamino-4-bromo-5-hydroxy-anthraquinone-6-sulphonic acids with amines or sulphonated amines by one of the methods described in Examples 1, 3(A) and 4 – 11 yields the dyestuffs which are listed in the following Table and correspond to the general formula

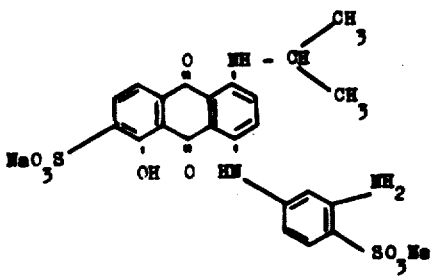

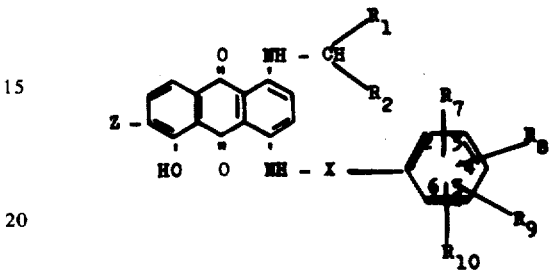

or their sodium salts.

| X | $R_1$ | $R_2$ | $R_7$ | $R_8$ | $R_9$ | $R_{10}$ | Z | Shade on Wool |
|---|---|---|---|---|---|---|---|---|
| — | $CH_3$ | $CH_3$ | $CH_3(3)$ | H | H | $SO_3H$ | H | greenish blue |
| — | $CH_3$ | $CH_3$ | $CH_3(3)$ | H | $SO_3H$ | $SO_3H$ | $SO_3H$ | blue-green |
| — | $CH_3$ | $CH_3$ | $OCH_3(2)$ | H | H | $SO_3H$ | H | blue-green |
| — | $CH_3$ | $CH_3$ | $OC_2H_5(4)$ | H | H | $SO_3H$ | H | greenish blue |
| — | $CH_3$ | $CH_3$ | $OC_2H_5(4)$ | H | H | $SO_3H$ | $SO_3H$ | blue-green |
| — | $CH_3$ | $CH_3$ | $Cl(3)$ | H | H | $SO_3H$ | H | greenish-blue |
| — | $CH_3$ | $CH_3$ | $Cl(3)$ | H | $SO_3H$ | $SO_3H$ | H | blue-green |
| — | $CH_3$ | $CH_3$ | $Cl(4)$ | H | H | $SO_3H$ | H | greenish blue |
| — | $CH_3$ | $CH_3$ | $Cl(4)$ | H | H | $SO_3H$ | $SO_3H$ | blue-green |
| — | $CH_3$ | $CH_3$ | $NH_2(4)$ | H | H | $SO_3H$ | H | greenish blue |
| — | $CH_3$ | $CH_3$ | $NH_2(4)$ | H | H | $SO_3H$ | $SO_3H$ | blue-green |
| — | $CH_3$ | $CH_3$ | $NH-CH_3(4)$ | H | H | $SO_3H$ | H | greenish blue |
| — | $CH_3$ | $CH_3$ | $NH-CH_3(4)$ | H | H | $SO_3H$ | $SO_3H$ | greenish blue |
| — | $CH_3$ | $CH_3$ | $NH-COCH_3(4)$ | H | H | $SO_3H$ | H | blue-green |
| — | $CH_3$ | $CH_3$ | $NH-COCH_3(4)$ | H | H | $SO_3H$ | $SO_3H$ | bluish green |
| — | $CH_3$ | $CH_3$ | $N-COCH_3(4)$ | H | H | $SO_3H$ | H | greenish blue |
| — | $CH_3$ | $CH_3$ | $CH_3$ $N-COCH_3(4)$ | H | H | $SO_3H$ | $SO_3H$ | greenish blue |
| — | $CH_3$ | $CH_3$ | $CH_3$ $N-COCH_3(3)$ | H | H | $SO_3H$ | H | blue |
| — | $CH_3$ | $CH_3$ | $CH_3$ $N-COCH_3(3)$ | H | H | $SO_3H$ | $SO_3H$ | greenish blue |
| — | $CH_3$ | $CH_3$ | $CH_3$ H | H | H | $SO_3H$ | H | greenish blue |
| — | $CH_3$ | $CH_3$ | H | H | $SO_3H$ | $SO_3H$ | $SO_3H$ | blue-green |
| — | $CH_3$ | $CH_3$ | $CH_3(2)$ | $CH_3(4)$ | $CH_3(6)$ | $SO_3H$ | H | clear blue |
| — | $CH_3$ | $CH_3$ | $CH_3(2)$ | $CH_3(4)$ | $CH_3(6)$ | $SO_3H$ | $SO_3H$ | greenish blue |
| — | $CH_3$ | $CH_3$ | $C_2H_5(2)$ | $CH_3(4)$ | $C_2H_5(6)$ | $SO_3H$ | H | clear blue |
| — | $CH_3$ | $CH_3$ | $C_2H_5(2)$ | $CH_3(4)$ | $C_2H_5(6)$ | $SO_3H$ | $SO_3H$ | greenish blue |
| — | $CH_3$ | $CH_3$ | $CH_3(2)$ | H | $CH_3(6)$ | $SO_3H$ | H | clear blue |
| — | $CH_3$ | $CH_3$ | $CH_3(2)$ | H | $CH_3(6)$ | $SO_3H$ | $SO_3H$ | greenish blue |
| — | $CH_3$ | $CH_3$ | $Br(3)$ | H | H | $SO_3H$ | H | greenish blue |
| — | $CH_3$ | $CH_3$ | $Br(3)$ | H | H | $SO_3H$ | $SO_3H$ | blue-green |
| — | $CH_3$ | $CH_3$ | $NHCO-CH_2-OH(3)$ | H | H | $SO_3H$ | H | green-blue |
| — | $CH_3$ | $CH_3$ | $NHCO-CH_2-OH(4)$ | H | H | $SO_3H$ | H | blue-green |
| — | $CH_3$ | $CH_3$ | $NHCO-CH_2-OSO_3H(4)$ | H | H | $SO_3H$ | H | blue-green |
| — | $CH_3$ | $CH_3$ | $NHCO-CH_2-OSO_3H(4)$ | H | H | $SO_3H$ | $SO_3H$ | blue-green |
| — | $CH_3$ | $CH_3$ | $CH_3(2)$ | $-NH_2(3)$ | H | $SO_3H$ | H | greenish blue |
| — | $CH_3$ | $CH_3$ | $CH_3(2)$ | $-N-COCH_3$ $C_2H_5(5)$ | H | $SO_3H$ | H | greenish blue |
| — | $CH_3$ | $CH_3$ | $COOH(2)$ | H | H | H | $SO_3H$ | greenish blue |
| — | $CH_3$ | $CH_3$ | $COOH(4)$ | H | H | H | $SO_3H$ | greenish blue |
| — | $CH_3$ | $CH_3$ | $CO-NH_2(4)$ | H | H | $SO_3H$ | H | greenish blue |
| — | $CH_3$ | $C_2H_5$ | $CH_3(4)$ | H | H | $SO_3H$ | H | blue-green |
| — | $CH_3$ | $C_2H_5$ | $NHCO-CH_3(4)$ | H | H | $SO_3H$ | $SO_3H$ | bluish green |
| — | $C_2H_5$ | $C_2H_5$ | $NHCO-CH_3(4)$ | H | H | $SO_3H$ | H | greenish blue |
| — | $CH_2OH$ | $C_2H_5$ | $Cl(4)$ | H | H | $SO_3H$ | H | greenish blue |
| — | $CH_2OH$ | $C_2H_5$ | $NCO-CH_3(3)$ $CH_3$ | H | H | $SO_3H$ | H | greenish blue |

-continued

| X | $R_1$ | $R_2$ | $R_7$ | $R_8$ | $R_9$ | $R_{10}$ | Z | Shade on Wool |
|---|---|---|---|---|---|---|---|---|
| — | $CH_2OSO_3H$ | $C_2H_5$ | $NHCO-CH_3(4)$ | H | H | $SO_3H$ | $SO_3H$ | green-blue |
| $-CH_2-CH_2-$ | $CH_3$ | $CH_3$ | H | H | H | $SO_3H$ | H | blue |
| $-CH_2-CH_2-$ | $CH_3$ | $CH_3$ | $CH_3(4)$ | H | H | $SO_3H$ | $SO_3H$ | blue |
| $-CH\,CH_2CH_2-$ | $CH_3$ | $CH_3$ | H | H | H | $SO_3H$ | H | blue |
| $CH_3$ | | | | | | | | |
| $-CHCH_2CH_2-$ | $CH_3$ | $CH_3$ | H | H | H | $SO_3H$ | H | blue |
| $CH_3$ | | | | | | | | |
| $CH_2-CH$ | | | | | | | | |
| $CH_3$ | | | | | | | | |
| — | $CH_3$ | $CH_3$ | $CH_3(3)$ | H | $SO_3H$ | $SO_3H$ | H | greenish blue |
| — | $CH_3$ | $CH_3$ | $OCH_3(3)$ | H | H | $SO_3H$ | H | greenish blue |
| — | $CH_3$ | $CH_3$ | $OCH_3(3)$ | H | H | $SO_3H$ | $SO_3H$ | blue-green |
| — | $CH_3$ | $CH_3$ | H | H | $SO_3H$ | $SO_3H$ | H | greenish blue |
| — | $CH_3$ | $CH_3$ | H | H | H | H | $SO_3H$ | greenish blue |
| — | $CH_3$ | $CH_3$ | $CH_3(3)$ | H | H | H | $SO_3H$ | strongly greenish blue |
| — | $CH_3$ | $CH_3$ | $CH_3(4)$ | H | H | H | $SO_3H$ | strongly greenish blue |
| — | $CH_3$ | $CH_3$ | $\begin{array}{c}CH_3\\-C-CH_3(4)\\CH_3\end{array}$ | H | H | H | $SO_3H$ | strongly greenish blue |
| — | $CH_3$ | $CH_3$ | $-OCH_3(2)$ | H | H | H | $SO_3H$ | green-blue |
| — | $CH_3$ | $CH_3$ | $-OCH_3(3)$ | H | H | H | $SO_3H$ | green-blue |
| — | $CH_3$ | $CH_3$ | $-NH-CO-CH_3(4)$ | H | H | H | $SO_3H$ | strongly bluish green |
| — | $CH_3$ | $CH_3$ | $-NH-CO-CH_3(3)$ | H | H | H | $SO_3H$ | green-blue |
| — | $CH_3$ | $CH_3$ | $\begin{array}{c}-N-CO-CH_3(4)\\CH_3\end{array}$ | H | H | H | $SO_3H$ | green-blue |
| — | $CH_3$ | $CH_3$ | $-NH_2(3)$ | H | H | H | $SO_3H$ | greenish blue |
| — | $CH_3$ | $CH_3$ | $Cl(4)$ | H | H | H | $SO_3H$ | blue |
| — | $CH_3$ | $CH_3$ | $CH_3(2)$ | $C_2H_5(6)$ | H | H | $SO_3H$ | blue |
| — | $CH_3$ | $CH_3$ | $CH_3(2)$ | $CH_3(4)$ | $CH_3(6)$ | H | $SO_3H$ | blue |
| — | $CH_3$ | $C_2H_5$ | H | H | H | H | $SO_3H$ | greenish blue |
| $-CH-CH_2-CH_2-$<br>$CH_3$ | $CH_3$ | $CH_3$ | H | H | H | H | $SO_3H$ | blue |
| $-CH-CH_2-CH_2-$<br>⬡H | $CH_3$ | $CH_3$ | H | H | $SO_3H$ | H | $SO_3H$ | blue |
| — | $CH_3$ | $CH_3$ |  | H | $SO_3H$ | H | H | greenish blue |
| — | $CH_3$ | $CH_3$ | $-S-CH_3(4)$ | H | $SO_3H$ | H | H | greenish blue |
| — | $CH_3$ | $CH_3$ |  | H | H | H | $SO_3H$ | greenish blue |
| — | $CH_3$ | $CH_3$ | $F(3)$ | H | H | $SO_3H$ | H | blue |
| — | $CH_3$ | $CH_3$ |  | H | $SO_3H$ | H | H | blue |
| — | $CH_3$ | $CH_3$ |  | H | $SO_3H$ | H | H | greenish blue |
| — | $CH_3$ | $CH_3$ |  | H | $SO_3H$ | H | $SO_3H$ | blue-green |
| — | $CH_3$ | $CH_3$ | $CN(3)$ | H | H | H | $SO_3H$ | greenish-blue |
| $-CH_2-CH_2-O-$ | $CH_3$ | $CH_3$ | H | H | $SO_3H$ | H | H | blue |
| $-CH_2-CH_2-O-$ | $CH_3$ | $CH_3$ | H | H | $SO_3H$ | H | $SO_3H$ | greenish-blue |
| — | $CH_3$ | $CH_3$ | $OCH_2-CH_2-O-SO_3H(4)$ | H | $SO_3H$ | H | H | greenish blue |
| — | $CH_3$ | $CH_3$ |  | H | H | H | $SO_3H$ | greenish blue |
| — | $CH_3$ | $CH_3$ |  | H | $SO_3H$ | H | H | greenish blue |

-continued

| X | $R_1$ | $R_2$ | $R_7$ | $R_8$ | $R_9$ | $R_{10}$ | Z | Shade on Wool |
|---|---|---|---|---|---|---|---|---|
|  | $CH_3$ | $CH_3$ | H | H | $SO_3H$ | H | $SO_3H$ | blue |
| — | $CH_3$ | $CH_3$ |  | H | $SO_3H(3)$ | H | H | blue-green |
| — | $CH_3$ | $CH_3$ | $-CH_2-SO_3H$ | H | H | H | $SO_3H$ | blue-green |
| — | $CH_3$ | $CH_3$ | $-CH_2-SO_3H$ | H | H | H | H | greenish blue |

EXAMPLE 12

18 Parts 1-isopropylamino-4-bromo-5-hydroxy-anthraquinone, 14.5 parts cyclohexylamine, 6 parts potassium acetate and catalytic amounts of copper(I) chloride are stirred at 70°–80° until only small amounts of starting material can be detected (appr. 6 are required). The mixture is then diluted with 50 parts ethylene glycol monomethyl ether, the precipitated reaction product is filtered off with suction at 60°, washed with ethylene glycol ether, and finally stirred with dilute hydrochloric acid.

The resultant 1-isopropylamino-4-cyclohexylamino-5-hydroxy-anthraquinone is sulphonated as follows:

3 Parts are dissolved in 30 parts of 6% oleum and the solution is stirred at 20°–25° with the portionwise addition of a further 10 parts of 20% oleum until only a trace of the dyestuff base can be detected by chromatography. The mixture is poured into 200 parts of a 10% sodium chloride solution, the product is filtered off with suction, washed with a 5% sodium chloride solution until neutral, and dried. The dyestuff corresponds to the formula

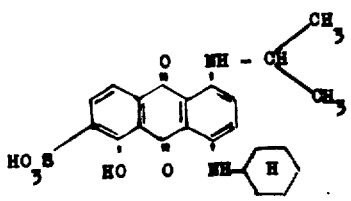

and can easily be purified by dissolving it in hot water at 90° to which a few drops of an organic solvent such as pyridine are added, clarification and precipitation with a saturated sodium chloride solution in a weakly alkaline medium. The dyestuff salt which is obtained in the form of fine needles dyes animal and synthetic polyamide fibres in brilliant greenish blue shades of good fastness properties, especially very good fastness to light and washing.

EXAMPLE 13

4.3 Parts 1-isopropylamino-4-cyclohexylamino-5-hydroxy-anthraquinone are introduced at room temperature into a clear solution of 2.5 parts boric acid in 23 parts by volume of 20% oleum and 1.5 parts by volume of 60% oleum and stirred with the portionwise addition of a total of 10 parts by volume of 20% oleum until the starting material can no longer be detected. The mixture is poured into a semi-concentrated sodium chloride solution, the resultant precipitate is filtered off with suction, washed with a dilute sodium chloride solution until neutral, and dried in a vacuum. The dyestuff obtained substantially corresponds to the formula given in Example 12, but it contains small amounts of another sulphonic acid of the same colour and unknown constitution. It dyes wool in a shade similar to that of the product obtained in Example 7.

EXAMPLE 14

10 Parts 1-isopropylamino-4-bromo-5-hydroxy-anthraquinone, 50 parts isobutylamine, 0.1 part each of copper(I) chloride and basic copper sulphate are boiled under reflux (appr. 70°) until only small amounts of starting material can be detected (appr. 2 hours are required). The mixture is diluted with 50 parts methanol, the precipitated needles are filtered off with suction in the cold, washed with methanol and hot water. It is also possible to filter off with suction without previous dilution with methanol. The 1-isopropylamino-5-hydroxy-4-isobutylamino-anthraquinone so obtained is sulphonated as follows:

10 Parts are stirred in 10% oleum at 25° – 30° until only traces of starting material can be detected. The mixture is poured into a semi-concentrated sodium chloride solution, the precipitate is filtered and washed with a sodium chloride solution until neutral. To remove some red byproduct which has been formed during sulphonation, the sulphonic acid is reprecipitated in the form of the sodium salt in the pH range of 9 – 10 from hot water by the addition of a sodium chloride solution. The dyestuff corresponds to the formula

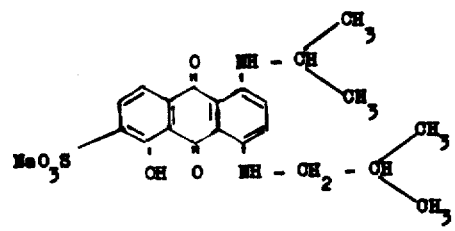

and dyes polyamide fibres in clear blue shades.

EXAMPLE 15

If the isobutylamine is replaced in Example 14 with the same amount of isopropylamine and the process is carried out at the same temperature but in an autoclave, then the same method of working up yields 1,4-diisopropylamino-5-hydroxy-anthraquinone, and sulphonation thereof by the same method as in Example 14 yields the dyestuff of the formula

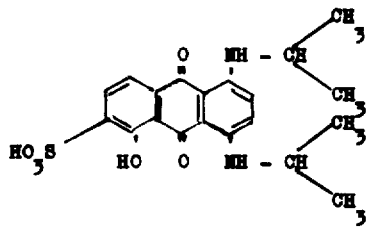

which dyes wool in clear blue shades.

EXAMPLE 16

If the 10 parts 1-isopropylamino-4-bromo-5-hydroxy-anthraquinone are replaced in Example 14 with 10.4 parts 1-isobutylamino-4-bromo-5-hydroxy-anthraquinone, then the same method yields 1-isobutylamino-(2')-5-hydroxy-4-isobutylamino-(1')-anthraquinone and the same sulphonation yields a dyestuff which corresponds to the formula

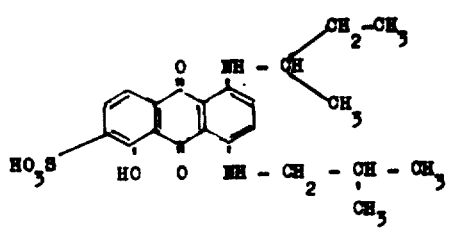

and dyes wool in clear blue shades.

EXAMPLE 17

A. 20 Parts 1-N-acetyl-isopropylamino-4-bromo-5-hydroxy-anthraquinone, 20 parts cyclohexylamine, 5 parts potassium acetate are stirred at 60° – 70° until the starting material can no longer be detected by chromatography. The red melt which initially is thinly liquid, temporarily becomes very thick, and towards the end of the reaction it again becomes appreciably more thinly liquid with the precipitation of crystalline needles. The mixture is diluted with 20 parts methanol, the product is filtered off with suction at room temperature, washed with methanol and hot water, and dried. The 1-N-acetyl-isopropylamino-4-cyclohexylamino-5-hydroxy-anthraquinone is obtained in a pure state in the form of red needles.

B. The same product is obtained when the 20 parts 1-N-acetyl-isopropylamino-4-bromo-5-hydroxy-anthraquinone are replaced in Example 17(A) with 22.1 parts 1-N-acetyl-isopropylamino-4-bromo-5-acetoxy-anthraquinone and the procedure there described is followed.

C. The product obtained by one of the processes described in Examples 17(A) or 17(B) is introduced in sieved form with vigorous stirring into 10 times its weight of 80% $H_2SO_4$, the mixture is heated to 60° and stirred at 60° until the starting material can no longer be detected by chromatography. The mixture is diluted with plenty of water, the precipitated product is filtered off with suction, washed with water until neutral, and dried in a vacuum. The 1-isopropylamino-4-cyclohexylamino-5-hydroxy-anthraquinone is obtained in very pure form.

EXAMPLE 18

If the β-phenyl-ethylamine is replaced in Example 8 with the same amount of cyclohexylamine, the reaction is initially allowed to proceed as there described at 60° – 65° but the temperature is then raised to 80° – 85° for 1½ hours, then there is obtained the compound

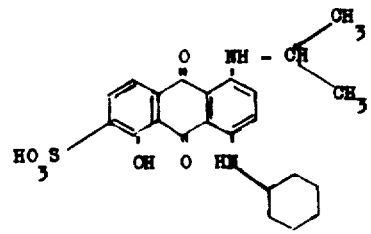

which is worked up as follows:

The compound is diluted with 30 parts by volume of 30% methanol, 5 parts by volume of concentrated hydrochloric acid are added, and the mixture is stirred on an ice-bath until the precipitate has solidified; it is then filtered off with suction and washed as described in Example 8. Parts are obtained.

From 1-iso-alkylamino-4-bromo-5-hydroxy-anthraquinone or its 6-sulphonic acid there are obtained, by one of the methods described in Examples 12 – 18, dyestuffs of the general formula

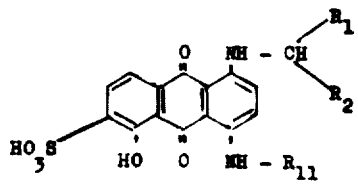

or their sodium salts.

| $R_1$ | $R_2$ | $R_{11}$ | Shade of Dyeing on Wool |
|---|---|---|---|
| $CH_3$ | $CH_3$ | ![cyclohexyl-NH2] | blue |
| $CH_3$ | $CH_3$ | ![cyclohexyl-CH3] | blue |
| $CH_3$ | $CH_3$ | ![cyclohexyl-OH] | blue |
| $CH_3$ | $CH_3$ | ![cyclohexyl-CH3] | blue |

-continued

| $R_1$ | $R_2$ | $R_{11}$ | Shade of Dyeing on Wool |
|---|---|---|---|
| $CH_3$ | $CH_3$ | —C₆H₄—NH—CO—CH₃ | blue |
| $CH_3$ | $CH_3$ | —CH₂—C₆H₅ | blue |
| $CH_3$ | $CH_3$ | —CH₃ | blue |
| $CH_3$ | $CH_3$ | —CH₂—CH₃ | blue |
| $CH_3$ | $CH_2$ | —CH—CH₂—CH₃<br>        CH₃  CH₃ | blue |
| $CH_3$ | $CH_3$ | —C₅H₁₁(n) | blue |
| $CH_3$ | $CH_3$ | —CH₂—CH₂—OH | blue |
| $CH_3$ | $CH_3$ | —CH₂—CH₂—CH₂—OCH₃ | blue |
| $CH_3$ | $CH_3$ | —CH₂—CH₂—NH₂ | blue |
| $CH_3$ | $CH_3$ | —CH₂—CH₂—CN | blue |
| $CH_3$ | $C_2H_5$ | —CH₂—CH₂—OSO₃H | blue |
| $CH_3$ | $CH_3$ | —CH₂—CH₂—OSO₃H | blue |
| $CH_3$ | $CH_3$ | —CH₂—CH₂—NHCO—CH₃ | blue |
| $CH_3$ | $C_2H_5$ | —C₆H₅ | blue |
| $CH_2OSO_3H$ | $C_2H_5$ | —C₆H₅ | blue |
| $C_2H_5$ | $C_2H_5$ | —CH₂—CHC₂H₅<br>           CH₃ | blue |

EXAMPLE 19

10 Parts 1-isopropylamino-4-m-amino-anilino-5-hydroxy-anthraquinone, obtained from 1-isopropylamino-4-bromo-5-hydroxy-anthraquinone with m-phenylene-diamine in analogy with Example 1 but at a reaction temperature of 140° – 145°, are mixed in 30 parts pyridine at 55° – 60° with 5 parts acetic acid anhydride. The free amino group is acetylated after a short time. The mixture is diluted at 50° with 40 parts methanol, the precipitated 1-isopropylamino-4-m-acetamino-anilino-5-hydroxy-anthraquinone is filtered off with suction, washed with methanol and water, and dried.

A. Monosulphonation

3 Parts are stirred in 17 parts by volume of anhydrous sulphuric acid and 2 parts by volume of 20% oleum at room temperature for 1 hour. After working up in the usual way, there is obtained a dyestuff of the formula

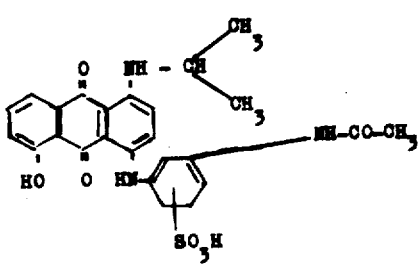

which dyes wool in a fast blue-green shade.

B. Disulphonation

By reacting, instead of 2 parts by volume, 5 parts by volume of 20% oleum under the same conditions as in (A), there is obtained, after 3 hours at room temperature and the usual working up, a mixture of different disulphonic acids, which dyes wool in a blue-green shade.

C. Trisulphonation

By reacting, instead of 2 parts by volume, 10 parts by volume of 20% oleum under the same conditions as in (A), there is obtained, after 4 hours at room temperature and the usual working up, a trisulphonated product which appears almost uniform in the chromatogram and dyes wool in a substantially more greenish shade than the dyestuffs obtained according to (A) and (B).

EXAMPLE 20

A. 15 Parts 1-isopropylamino-4-p-toluidino-5-hydroxy-anthraquinone, obtained according to Example 1, and 6.3 parts of ground sodium carbonate are stirred in 90 parts by volume nitrobenzene, the mixture is treated with 0.2 parts iodine, and 12.5 parts bromine are added with stirring within 20 minutes; the mixture is stirred at 55° – 60° for a further 20 minutes, then diluted with 180 parts by volume methanol while cooling with ice. The precipitated needles are filtered off with suction, washed with methanol and water. Yield: 12.2 parts. Bromine content: 18% (theory 17.2% for monobromo derivative).

B. 3 Parts of the product obtained according to (A) are dissolved in 17 parts by volume of anhydrous sulphuric acid, and 13 parts by volume of 20% oleum are gradually added at room temperature. The mixture is stirred until the monosulphonation product initially formed can no longer be detected by chromatography. The mixture is poured into a semi-concentrated sodium chloride solution, the precipitate is filtered off with suction and washed with a semi-concentrated sodium chloride solution until neutral.

The filter cake is dissolved in 200 parts of water and the sodium salt of the dyestuff of the formula

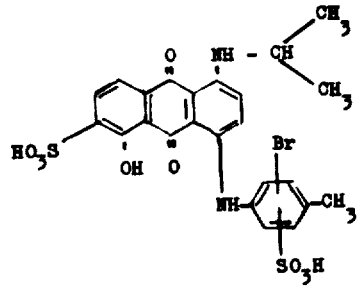

is precipitated in pure form by the addition of the necessary amount of a saturated sodium chloride solution. It dyes wool from an acidic bath in a strongly greenish blue shade.

EXAMPLE 21

12 Parts of dibrominated 1-isopropylamino-4-p-toluidino-5-hydroxy-anthraquinone (bromine content 28.6%), obtained by the reaction of an excess of bromine on a nitrobenzene solution of 1-isopropylamino-4-p-toluidino-5-hydroxy-anthraquinone, are dissolved in 100 parts by volume of anhydrous sulphuric acid, this solution is mixed at 0° – 10° with 25 parts by volume of 20% oleum and stirred over night at 10°. The solution is poured with stirring into a cold 10% sodium chloride solution and worked up in analogy with Example 20(B). 10.2 Parts of dyestuff are obtained. It is the sodium salt of the compound

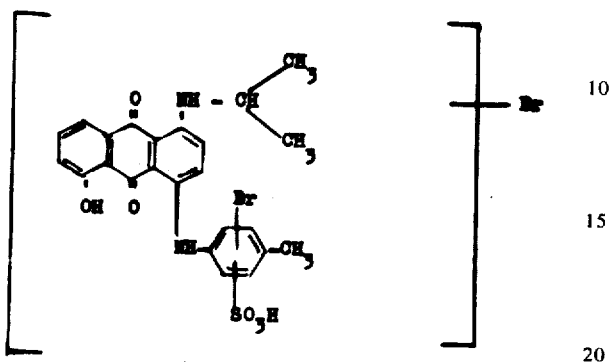

No further sulpho group can be introduced into this molecule by the addition of more oleum.

EXAMPLE 22

5 Parts 1-isopropylamino-4-p-toluidino-5-hydroxy-anthraquinone are dissolved in 50 parts of anhydrous sulphuric acid, 1.75 parts by volume of 20% oleum are added, and the mixture is stirred until no more unsulphonated material can be detected. The mixture is diluted with 4 parts of water while cooling, 2.5 parts bromine are added, and stirring is continued at room temperature over night. The mixture is poured into 500 parts of a cold 5% sodium chloride solution, the product is filtered off with suction, washed with a 3% sodium chloride solution until neutral, carefully rinsed with cold water, and dried. There are obtained 7 parts of a product of the formula

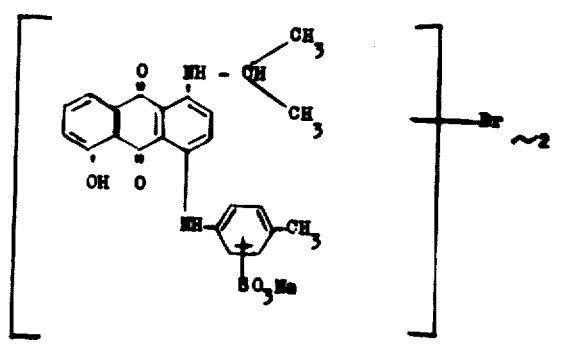

NaCl content: 1.2%; bromine content 23.8% (theory for dibromo compound 24.8%).

The dyestuff dyes wool in a greenish blue shade.

EXAMPLE 23

30 Parts 2-amino-pyridine, 10 parts 1-isopropylamino-4-bromo-5-hydroxy-anthraquinone, 3.5 parts potassium acetate and 0.05 parts copper(I) chloride are stirred at 125° – 130° until only traces of the starting material can be detected in a sample (appr. 20 hours are required).

The mixture is then diluted with 45 parts methanol, the product is filtered off with suction at 70°, washed with hot methanol and hot water, and dried. 4.6 Parts of a product of the formula

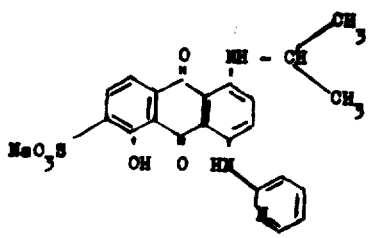

are obtained.

B. 2.7 Parts of the product obtained according to (A) are dissolved in 17 parts by volume of sulphuric acid monohydrate, the solution is gradually mixed with 11 parts by volume of oleum at 20° – 25° and stirred until less than 3% of starting material are present (appr. 5 hours are required).

The dyestuff of the formula

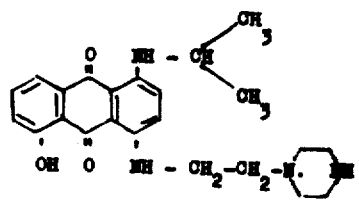

is precipitated from the filtrate by the addition of 10 parts by volume of a saturated sodium chloride solution, filtered off with suction in the cold, washed with a 5% sodium chloride solution, and dried. 2.1 Parts are obtained.

Wool and Perlon are dyed according to the processes described in Example 2 in greenish blue shades.

EXAMPLE 24

A. If the 30 parts 2-amino-pyridine are replaced in Example 23(A) with 20 parts N-(β-aminoethyl)-piperazine and the operation is carried out at 60° – 65°, then the same method of working up yields a fairly pure product which presumably corresponds to the formula B. 2 Parts of the dyestuff obtained according to (A) are dissolved in 15 parts sulphuric acid monohydrate, 12 parts of 20% oleum are added at room temperature, and the mixture is stirred at the same temperature until the starting material can no longer be detected. The solution is added with stirring to an ice-cold saturated sodium chloride solution, the mixture is adjusted to pH 8 – 9 by means of a sodium hydroxide solution, the precipitate is filtered off with suction, washed with a little saturated sodium chloride solution, dissolved in 100 parts of water and precipitated at pH 11 with solid sodium chloride; the precipitate is washed with a saturated sodium chloride solution and dried. 2Parts of a dyestuff of the formula

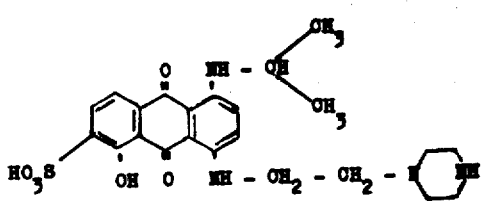

are obtained, which dyes wool in a greenish blue shade.

EXAMPLE 25

A. 10 Parts 1-isopropylamino-4-p-toluidino-5-hydroxy-anthraquinone are introduced at below 10° into a mixture of 65 parts by volume of chlorosulphonic acid and 10 parts by volume of thionyl chloride, and the mixture is stirred at below 10° for 1 hour and at 20° for another hour.

This solution is added dropwise at below 20° to a mixture of 300 parts of a saturated sodium chloride solution and 300 parts of ice while stirring vigorously. The resultant precipitate is filtered off with suction, washed with a cold dilute sodium chloride solution until neutral, washed with a little ice-cold water, and sharply pressed out.

The filtered material is gradually introduced into 40 parts by volume of dimethylamine while stirring, the mixture is heated to 50° – 55° in the course of 1 hour and the same temperature is maintained for another hour. The product is filtered off with suction at this temperature, washed with hot water until neutral, and dried at 60° in a vacuum. 11 Parts of a compound of the formula

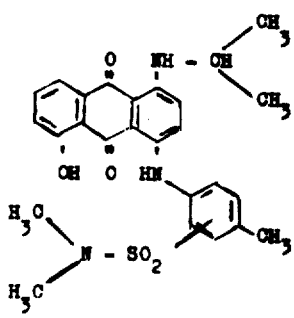

are obtained. It can be obtained in a completely pure form by recrystallisation from moist pyridine.

B. 5 Parts of the product obtained according to (A) are dissolved in 27 parts by volume of anhydrous sulphuric acid and mixed at 15° – 20° with 7 parts by volume of 20% oleum within one hour. The mixture is stirred at this temperature until the starting material can no longer be detected (appr. 3 hours are required). The solution is poured into an ice-cold semi-concentrated sodium chloride solution, the product is filtered off with suction, washed with a 10% sodium chloride solution until neutral, and dried in a vacuum. 6.6 Parts are obtained.

This dyestuff which presumably corresponds to the formula

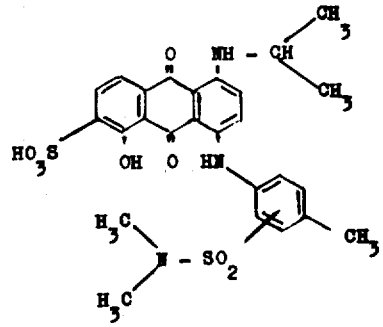

is readily soluble in hot water and dyes wool or polyamide fibres by the methods described in Example 2 in a clear greenish blue shade.

EXAMPLE 26

A. 10 Parts 1-isopropylamino-4-o-anisidino-5-hydroxyanthraquinone are introduced at 0° – 10° into 65 parts by volume of chlorosulphonic acid; the starting material can no longer be detected by chromatography after 20 minutes. This solution is added dropwise at below 20° to 600 ml of an ice-cold semi-concentrated sodium chloride solution. The resultant precipitate is filtered off with suction, washed with a cold diluted sodium chloride solution until neutral, rinsed with methanol or acetone until anhydrous, and dried. The product is gradually introduced with stirring into 50 parts by volume of methylamine, and stirring is continued at 50° – 55° until no more progress of the sulphamide formation can be detected by chromatography. After working up in analogy with the method described in Example 25(A), there are obtained 11.4 parts of a compound corresponding to the formula

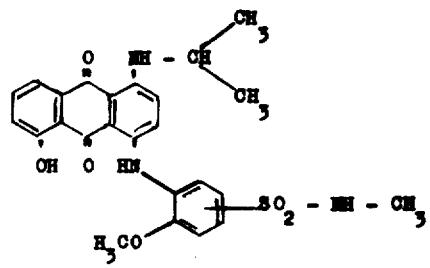

B. 5 Parts of the product obtained according to (A) are dissolved at below 20° in 27 parts by volume of 3% oleum, this solution is mixed with 2 parts by volume of 20% oleum and stirred until the starting material can no longer be detected by chromatography (appr. 2 hours are required). The mixture is poured with stirring into a 15% cold sodium chloride solution, the resultant precipitate is filtered off with suction, washed with a dilute sodium chloride solution until neutral, and dried. There are obtained 6.9 parts of a product which contains sodium chloride and corresponds to the formula

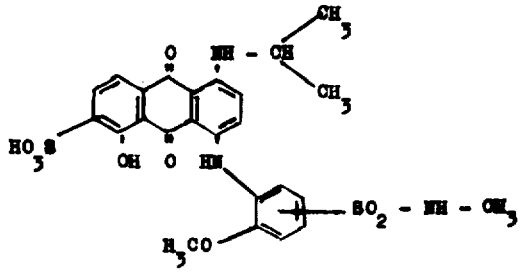

This dyestuff dyes wool and polyamide fibres according to the dyeing instructions given in Example 2 in fast green-blue shades.

By one of the methods described in Examples 25 – 26 there are obtained from 1-isoalkylamino-4-arylamino-5-hydroxyanthraquinones by sulphochlorination and subsequent reaction with amines, and subsequent sulphonation the dyestuffs listed in the following Table and corresponding to the general formula

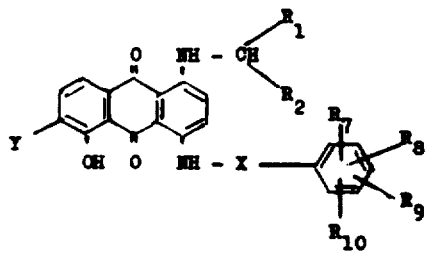

or their alkali metal salts.

EXAMPLE 27

A. 4.85 Parts N-methylol-caprolactam are introduced into 50 parts by volume of 93% sulphuric acid at 10°, and the mixture is stirred until a clear solution has formed; 12.05 parts 1-isopropylamino-4-o-anisidino-5-hydroxy-anthraquinone are introduced into this solution at 15° – 20° and stirring is continued at room temperature until less than 3% of starting material can be detected in a sample by chromatography (appr. 2 – 3 hours are required). The mixture is poured into icewater, the resultant precipitate is filtered, washed neutral, and dried. 15.3 Parts of a compound of the formula

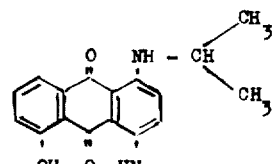
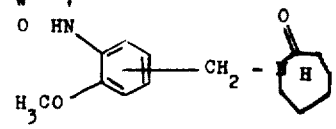

| $R_1$ | $R_2$ | $R_7$ | $R_8$ | $R_9$ | $R_{10}$ | X | Y | Shade on Wool |
|---|---|---|---|---|---|---|---|---|
| $CH_3$ | $CH_3$ | $-SO_2-N(CH_3)CH_3$ | $CH_3(2)$ | H | H | — | $SO_3H$ | blue |
| $CH_3$ | $CH_3$ | " | $-C(CH_3)_2CH_3(4)$ | H | H | — | $SO_3H$ | " |
| $CH_3$ | $CH_3$ | " | $CH_3(2)$ | $CH_3(4)$ | $CH_3(6)$ | — | $SO_3H$ | reddish blue |
| $CH_3$ | $CH_3$ | " | $CH_3(2)$ | H | $C_2H_5(6)$ | — | $SO_3H$ | " |
| $CH_3$ | $CH_3$ | " | H | H | H | $-CH_2-CH_2-$ | $SO_3H$ | " |
| $CH_3$ | $CH_3$ | $-SO_2-NH-CH_3$ | $OCH_3(4)$ | H | H | — | $SO_3H$ | greenish blue |
| $CH_3$ | $CH_3$ | $-SO_2-NH-CH_3$ | $CH_3(4)$ | H | H | — | $SO_3H$ | blue |
| $CH_3$ | $CH_3$ | $-SO_2-NH-CH_3$ | $-C(CH_3)_2CH_3(4)$ | H | H | — | $SO_3H$ | " |
| $CH_3$ | $C_2H_5$ | $-SO_2-NH-CH_3$ | $CH_3(2)$ | $CH_3(4)$ | $CH_3(6)$ | — | $SO_3H$ | reddish blue |
| $CH_3$ | $C_2H_5$ | $-SO_2-NH_2$ | $CH_3(3)$ | H | H | — | $SO_3H$ | blue |
| $CH_3$ | $CH_3$ | $-SO_2-NH_2$ | $OCH_3(2)$ | H | H | — | $SO_3H$ | greenish blue |
| $C_2H_5$ | $C_2H_5$ | $-SO_2-NH_2$ | $-C(CH_3)_2CH_3$ | H | H | — | $SO_3H$ | blue |
| $CH_3$ | $CH_3$ | $-SO_2-NH-CH_2-CH_2-C_6H_4-SO_3H$ | $OCH_3(2)$ | H | H | — | H | green-blue |
| $CH_3$ | $CH_3$ | " | $OCH_3(2)$ | H | H | — | $SO_3H$ | bluish green |
| $CH_3$ | $CH_3$ | $-SO_2-NH-CH_2-CH_2-OSO_3H$ | $OCH_3(4)$ | H | H | — | $SO_3H$ | greenish blue |
| $CH_3$ | $CH_3$ | $-SO_2-N(morpholino)$ | $CH_3(4)$ | H | H | — | $SO_3H$ | blue-green |
| $CH_3$ | $CH_3$ | $-SO_2-NH-CH(CH_3)-CH_2-CH_2-C_6H_4-SO_3H$ | $OCH_3(2)$ | H | H | — | H | greenish blue |
| $CH_3$ | $CH_3$ | " | $OCH_3(2)$ | H | H | — | $SO_3H$ | blue-green |
| $CH_3$ | $CH_3$ | $-SO_2-N[CH_2-CH(C_2H_5)-(CH_2)_3-CH_3]_2$ | $OCH_3(2)$ | H | H | — | $SO_3H$ | greenish-blue |
| $CH_3$ | $CH_3$ | $-SO_2-NH-C_6H_4-SO_3H$ | $OCH_3(4)$ | H | H | — | H | greenish-blue |
| $CH_3$ | $CH_3$ | $-SO_2-NH-C_6H_3(OCH_3)(SO_3H)$ | H | H | H | — | $SO_3H$ | bluish green | are obtained. The product is fairly pure; it can be purified from small proportions of starting material, a bis-condensation product and sulphonated base (together 5 – 7%), for example, by recrystallisation from pyridine.

B. 4 Parts of the product obtained according to (A) are dissolved in 20 parts by volume of sulphuric acid monohydrate, the solution is mixed with 2 parts by volume of 2% oleum and stirred at 20° - 30° until only traces of the starting material are present. The solution is poured with stirring into 300 parts of a mixture of a saturated sodium chloride solution and ice (2:1), the precipitated product is filtered off with suction, washed with a 5% sodium chloride solution until neutral, and dried. The product so obtained is a monosulphonic acid derivative of the compound obtained in (A) and dyes wool and Perlon in green-blue shades of outstanding fastness to wet processing.

EXAMPLE 28

A. 5.15 Parts N-hydroxymethyl-phthalimide are dissolved in 50 parts by volume of 96% sulphuric acid at 10°, 10 parts 1-isopropylamino-4-(2',4',6'-trimethyl)-anilino-5-hydroxy-anthraquinone are introduced at below 20°, a further 0.7 parts N-hydroxymethyl-phthalimide are added after 2 hours at the same temperature, and the mixture is stirred until only traces of the starting material can be detected. The mixture is poured into ice-water, the precipitate is filtered off with suction, washed with water until neutral, and dried. There are obtained 14.6 parts of a product which is not completely homogeneous and the main component of which corresponds to the formula

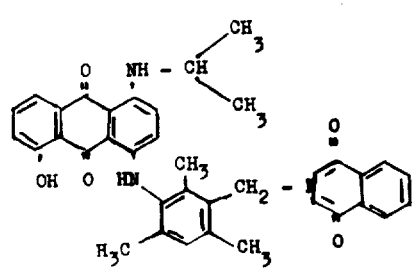

It can be purified and freed from the byproducts which have almost the same colour, for example, by recrystallisation from dimethyl formamide.

B. The compound obtained according to (A) is dissolved in five times its volume of sulphuric acid monohydrate, sufficient 20% oleum is added at 20° - 25° until only traces of the starting material can be detected, and the mixture is worked up as described in Example 27(B). A monosulphonation product is obtained, which is not completely homogeneous and the main component of which corresponds to a monosulphonic acid derivative of the formula of Example 28(A).

This product dyes wool and Perlon in clear greenish blue shades of outstanding fastness properties.

Compounds of the formula (B) can be obtained, starting from compounds of the formula (A) by reaction with the corresponding N-methylol-lactams or N-methylol-dicarboxamides and subsequent sulphonation according to the processes described in Examples 27 and 28

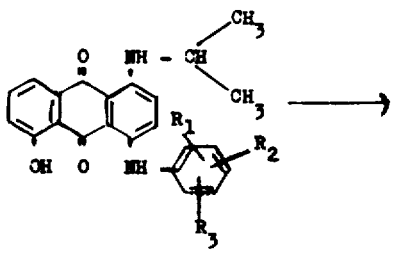

A

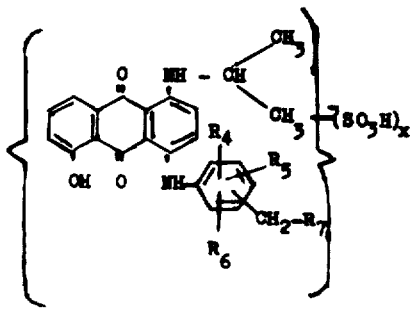

B

| | | A | | | | B | | X | Shade on Wool |
|---|---|---|---|---|---|---|---|---|---|
| $R_1$ | $R_2$ | $R_3$ | $R_4$ | $R_5$ | $R_6$ | $R_7$ | | | |
| OCH$_3$(4) | H | H | OCH$_3$(4) | H | H | -NH⟨C=O ring⟩ | | 1 | green-blue |
| OCH$_3$(3) | H | H | OCH$_3$(3) | H | H | " | | 1 | " |
| CH$_3$(4) | H | H | CH$_3$(4) | H | H | " | | 1 | greenish blue |
| CH$_3$(3) | H | H | CH$_3$(3) | H | H | " | | 1 | " |
| —C(CH$_3$)$_2$—CH$_3$(4) | H | H | —C(CH$_3$)$_2$—CH$_3$(4) | H | H | " | | 1 | " |
| CH$_3$(2) | CH$_3$(6) | H | CH$_3$(2) | CH$_3$(6) | H | " | | 1 | blue |
| CH$_3$(2) | CH$_3$(6) | H | CH$_3$(2) | CH$_3$(6) | H | -N⟨phthalimide⟩ | | 1 | " |

-continued

| R₁ | R₂ | A R₃ | R₄ | R₅ | R₆ | B R₇ | X | Shade on Wool |
|---|---|---|---|---|---|---|---|---|
| CH₃(2) | CH₃(6) | H | CH₃(2) | CH₃(6) | H | '' | 2 | '' |
| CH₃(2) | C₂H₅(6) | H | CH₃(2) | C₂H₅(6) | H |  | 1 | blue |
| CH₃(4) | CH₃(4) | CH₃(6) | CH₃(2) | CH₃(4) | CH₃(6) | '' | 1 | '' |
| OCH₃(2) | H | H | OCH₃(2) | H | H |  | 1 | green-blue |
| OCH₃(2) | H | H | OCH₃(2) | H | H | '' | 2 | '' |
| OCH₃(4) | H | H | OCH₃(4) | H | H | 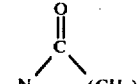 | 1 | |
| OCH₃(4) | H | H | OCH₃(4) | H | H | 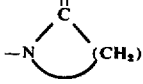 | 1 | |
| OCH₃(4) | H | H | OCH₃(4) | H | H | 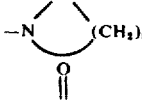 | 1 | |
| OCH₃(4) | H | H | OCH₃(4) | H | H | 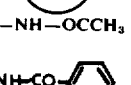 | 1 | |
| OCH₃(2) | H | H | OCH₃(2) | H | H | —NH—OCCH₃ | 1 | |
| OCH₃(4) | H | H | OCH₃(4) | H | H | 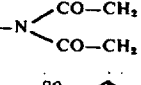 | 1 | |
| OCH₃(2) | H | H | OCH₃(2) | H | H | —NH—CO—NH₂ | 1 | |
| OCH₃(4) | H | H | OCH₃(4) | H | H | 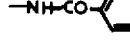 | 1 | |
| OCH₃(4) | H | H | OCH₃(4) | H | H | 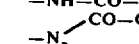 | 1 | |
| OCH₃(4) | H | H | OCH₃(4) | H | H | 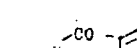 | 1 | |
| OCH₃(4) | H | H | OCH₃(4) | H | H | —NH—CO—OC₂H₅ | 1 | |
| OCH₃(4) | H | H | OCH₃(4) | H | H | —NH—CO—CH₂Cl | 1 | |

We claim:
1. Dyestuff which contains sulfonic acid groups and has the following formula:

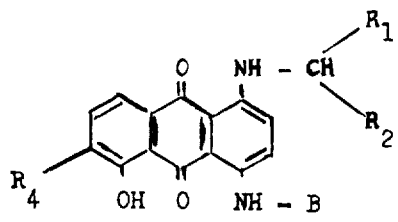

wherein
R₁ and R₂ are alkyl of 1–3 carbon atoms or substituted alkyl of 1–3 carbon atoms where the substituent is hydroxy or sulphato;
R₄ is hydrogen or sulfonic acid; and
B is alkyl of 1–6 carbon atoms, allyl, hydroxyethyl, methoxyethyl, aminoethyl, methylaminoethyl, ω-carboxypropyl, cyanoethyl, sulphatoethyl, cyclohexyl, hydroxycyclohexyl, 4-methoxycyclohexyl, 3-methylcyclohexyl, 4-methylcyclohexyl, or 4-aminocyclohexyl; and B must contain sulfonic acid group when R₄ is hydrogen.

2. Dyestuff of claim 1 of the formula

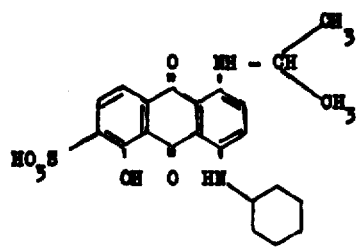

* * * * *